US007452269B2

(12) United States Patent
Gauselmann

(10) Patent No.: US 7,452,269 B2
(45) Date of Patent: Nov. 18, 2008

(54) VIDEO GAMING MACHINE PLAYING SECONDARY GAME USING DISPLAYED SYMBOLS

(75) Inventor: Michael Gauselmann, Espelkamp (DE)

(73) Assignee: Atronic International GmbH, Lübbecke (DE)

( * ) Notice: Subject to any disclaimer, the term of this patent is extended or adjusted under 35 U.S.C. 154(b) by 21 days.

(21) Appl. No.: 10/290,632

(22) Filed: Nov. 8, 2002

(65) Prior Publication Data

US 2004/0092302 A1 May 13, 2004

(51) Int. Cl.
*A63F 13/00* (2006.01)
*A63F 3/06* (2006.01)

(52) U.S. Cl. ................................ 463/16; 463/18; 463/20

(58) Field of Classification Search ............... 463/9–22, 463/30, 31; 273/143 R, 236, 267–270
See application file for complete search history.

(56) References Cited

U.S. PATENT DOCUMENTS 1,527,929 A * 2/1925 Simons ....................... 273/139
3,533,629 A * 10/1970 Raven .......................... 463/18
3,556,531 A * 1/1971 Elder ...................... 273/143 R
3,834,712 A * 9/1974 Cox ........................ 273/143 R
4,364,567 A * 12/1982 Goott .......................... 273/237
4,778,182 A * 10/1988 Brignole ................. 273/144 A
5,651,735 A * 7/1997 Baba ............................ 463/18
5,947,820 A * 9/1999 Morro et al. .................... 463/9
5,997,401 A * 12/1999 Crawford ...................... 463/20
6,227,969 B1 * 5/2001 Yoseloff ....................... 463/13
6,270,412 B1 * 8/2001 Crawford et al. .............. 463/20

(Continued)

FOREIGN PATENT DOCUMENTS

AU 199748484 A1 7/1998

(Continued)

OTHER PUBLICATIONS

"The Hollywood Squares" The Game $how Page! [online] Retrieved from the Internet [Apr. 25, 2002].*

(Continued)

*Primary Examiner*—Xuan M. Thai
*Assistant Examiner*—Matthew D. Hoel
(74) *Attorney, Agent, or Firm*—Patent Law Group LLP; Brian D. Ogonowsky

(57) ABSTRACT

In one embodiment of the invention, a video gaming machine displays an array of symbols, and an award is granted based on any winning symbol combinations across activated pay lines. As a secondary game, after the initial display of the symbols, the player may designate one species of symbol in the array. Then, one of the symbols in the array is selected at random by the gaming machine. If the symbol designated by the player is the one selected by the machine, the player wins a special award. The secondary game may be activated pursuant to any of a variety of events, or activated after each game. The player may designate the symbol species by means of a touch screen or any other type of controller.

22 Claims, 3 Drawing Sheets

U.S. PATENT DOCUMENTS

| | | | | |
|---|---|---|---|---|
| 6,375,567 | B1 | 4/2002 | Acres | |
| 6,565,092 | B1 * | 5/2003 | McCarthy, Jr. | 273/292 |
| 6,648,758 | B2 * | 11/2003 | Bennett et al. | 463/20 |
| 6,682,947 | B1 * | 1/2004 | Madge | 438/14 |
| 6,743,034 | B2 * | 6/2004 | Shimada | 439/268 |
| 6,749,500 | B1 * | 6/2004 | Nelson et al. | 463/13 |
| 6,935,947 | B1 * | 8/2005 | Singer et al. | 463/16 |
| 2002/0025846 | A1 | 2/2002 | Bennett et al. | |
| 2003/0069063 | A1 * | 4/2003 | Bilyeu et al. | 463/20 |
| 2003/0224850 | A1 * | 12/2003 | Anderson et al. | 463/20 |

FOREIGN PATENT DOCUMENTS

| | | |
|---|---|---|
| WO | WO 98/20949 | 5/1998 |

OTHER PUBLICATIONS

"The Hollywood Squares" The Game $how Page! [online] Retrieved from the Internet [Apr. 25, 2002].*

"Bonus Game". The Price is Right. 1972. [online]. Retrieved from the Internet [Oct. 16, 2003]. URL: <http://gscentral.net/bonus.htm>.*

Keno and roulette chapters of "The Everything Casino Gambling Book," second edition, by Meg Elaine Schneider, Adams Media, Avon, Mass., copyright 2004.*

"Bonus Game," downloaded from http://gscentral.net/bonus.htm on Oct. 16, 2003.*

European Search Report, 3 pages.

* cited by examiner

VIDEO GAMING MACHINE PLAYING SECONDARY GAME USING DISPLAYED SYMBOLS

FIELD OF THE INVENTION

This invention relates to gaming machines and, in particular, to a special feature in a video-type gaming machine that displays symbols.

BACKGROUND

Video gaming machines that randomly select symbols for display on the video screen and grant awards to a player based upon the displayed symbol combinations are very popular. Typically, the game ends after the display of the symbols, and the player must then bet more credits in order to play again. The symbols may form a 3×1 array, having three symbols in a single row, or the display may be a two dimensional array of symbols having, for example, three rows of symbols in five columns. The granting of an award is based on the symbol combinations across pay lines extending across the array of symbols.

Although the above-described gaming machines are popular, it is desirable to create a game that achieves more player excitement to generate more revenue by the gaming machine.

SUMMARY

In one embodiment of the invention, a video gaming machine displays an array of symbols, and an award is granted based on any winning symbol combinations across activated pay lines. As a secondary game, after the initial display of the symbols, the player may designate one species of symbol in the array. For example, if the array contains four identical KING symbols, the player may designate the KING species of symbols to select the four KING symbols in the array. Other symbol species may only consist of one symbol in the array. Then, one of the symbols in the array is selected at random by the gaming machine. If the symbol designated by the player is the one selected by the machine, the player wins a special award.

The amount of the special award may depend on the likelihood of the player's designated symbol being selected by the machine. For example, if there were four symbols in the species displayed by the array, the special award would be less than had there been one symbol in the species.

The secondary game may be activated pursuant to any of a variety of events, or activated after each game.

The player may designate the symbol species by means of a touch screen or any other type of controller.

DETAILED DESCRIPTION

Although the invention can typically be implemented by installing a software program in most types of modem video gaming machines, one particular gaming machine platform will be described in detail.

Figure 1:
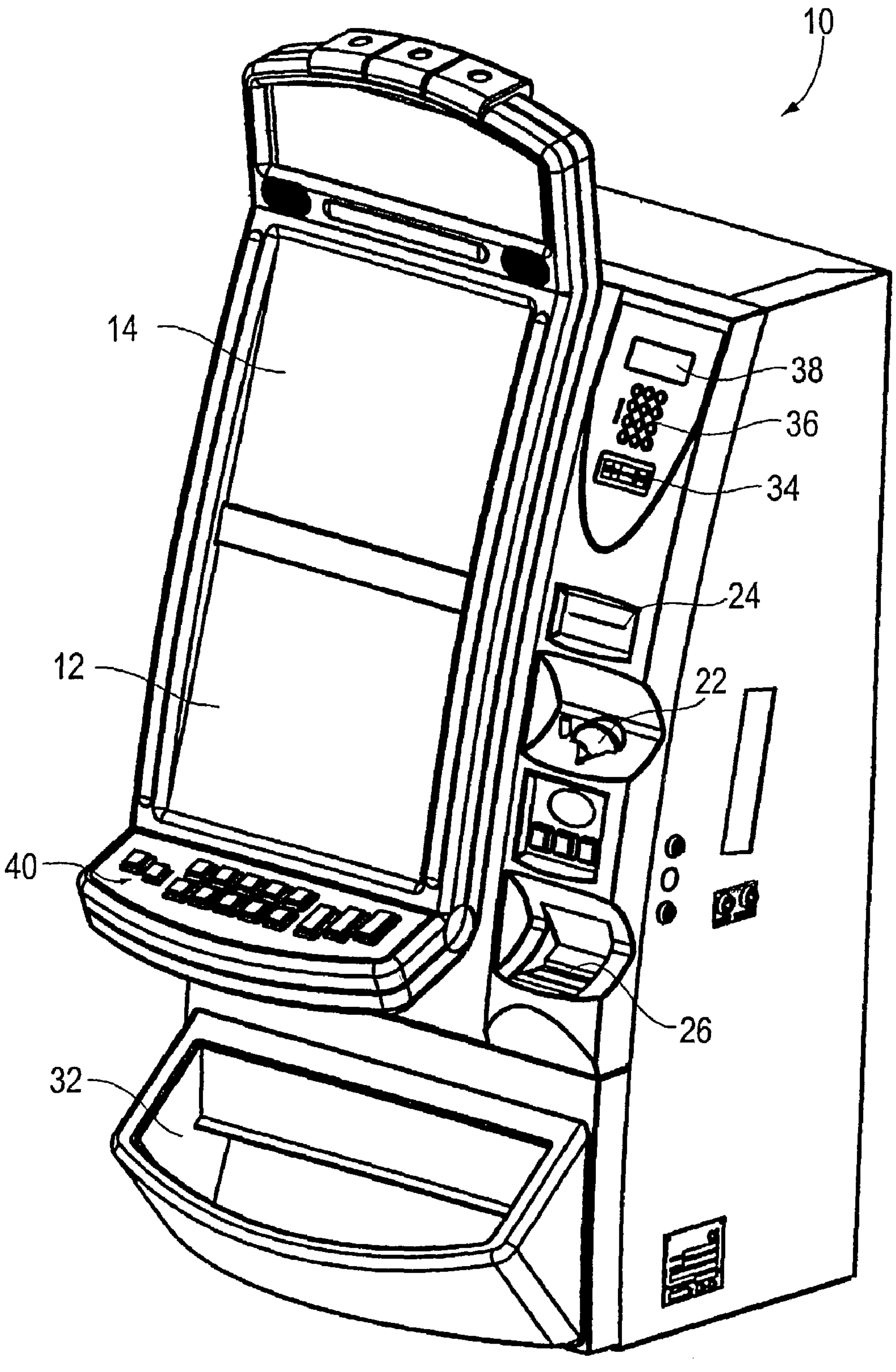
FIG. 1 is a perspective view of one type of video gaming machine that may be programmed to play the game in accordance with the present invention.

FIG. 1 is a perspective view of a gaming machine 10 that incorporates the present invention. Machine 10 includes a display 12 that may be a thin film transistor (TFT) display, a liquid crystal display (LCD), a cathode ray tube (CRT), or any other type of display. Display 12 may be a touch screen for inputting player commands. A second display 14 provides game data or other information in addition to display 12. Display 14 may provide static information, such as an advertisement for the game, the rules of the game, pay tables, pay lines, or other information, or may even display the game itself along with display 12. Alternatively, the area for display 14 may be a display glass for conveying information about the game.

A coin slot 22 accepts coins or tokens in one or more denominations to generate credits within machine 10 for playing games. A slot 24 for an optical reader and printer receives machine readable printed tickets and outputs printed tickets for use in cashless gaming. A bill acceptor 26 accepts various denominations of banknotes.

A coin tray 32 receives coins or tokens from a hopper upon a win or upon the player cashing out.

A card reader slot 34 accepts any of various types of cards, such as smart cards, magnetic strip cards, or other types of cards conveying machine readable information. The card reader reads the inserted card for player and credit information for cashless gaming. The card reader may also include an optical reader and printer for reading and printing coded barcodes and other information on a paper ticket.

A keypad 36 accepts player input, such as a personal identification number (PIN) or any other player information. A display 38 above keypad 36 displays a menu for instructions and other information and provides visual feedback of the keys pressed.

Player control buttons 40 include any buttons needed for the play of the particular game or games offered by machine 10 including, for example, a bet button, a repeat bet button, a play two-ways button, a spin reels button, a maximum bet button, a cash-out button, a display pay lines button, a display payout tables button, select symbol buttons, and any other suitable button. Buttons 40 may be replaced by a touch screen with virtual buttons, a joystick, a touchpad, or other types of controllers.

Figure 2:
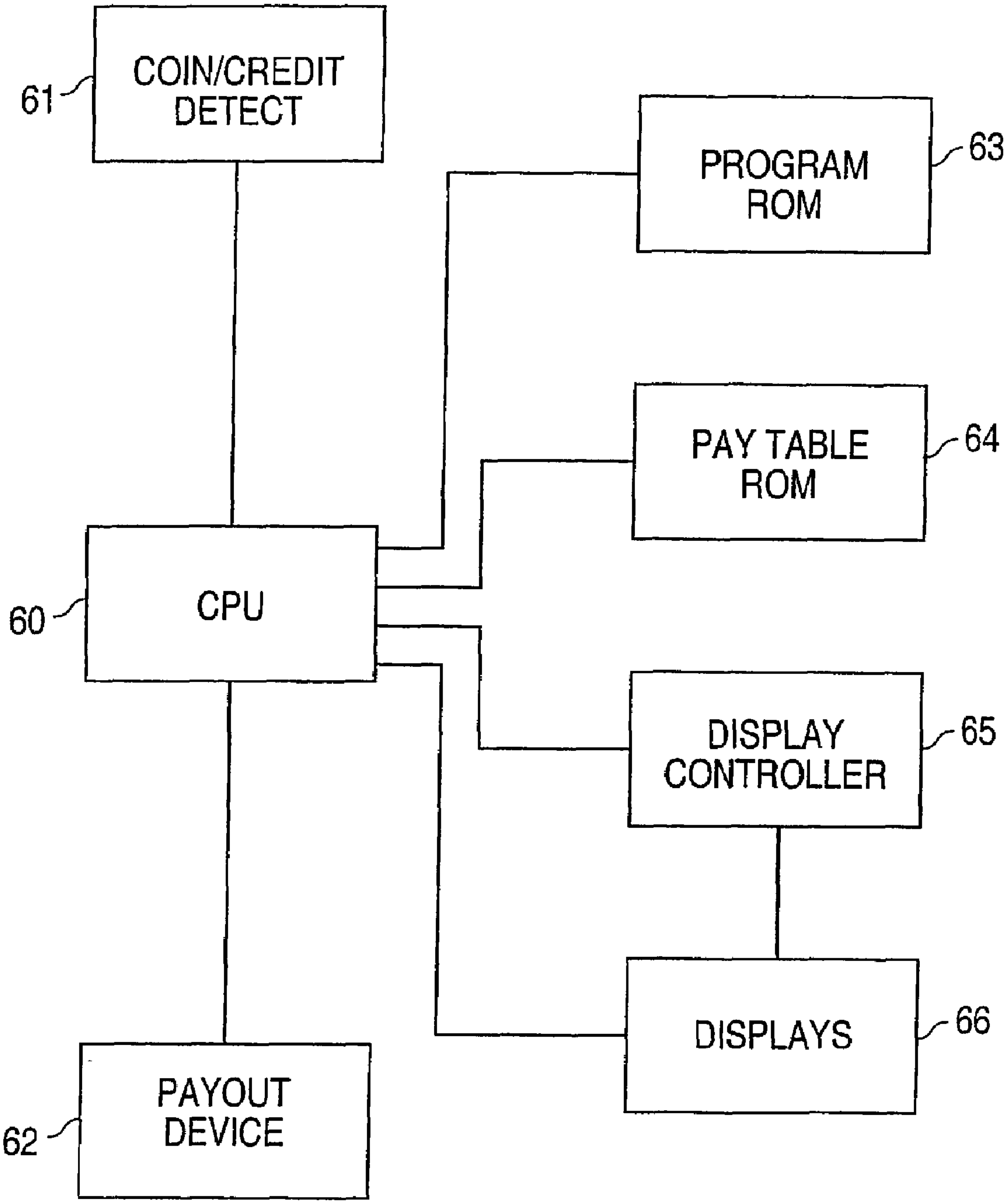
FIG. 2 is a block diagram illustrating various functional units in the machine of FIG. 1.

FIG. 2 illustrates basic circuit blocks in a suitable gaming device. A control unit (CPU 60) runs a gaming program stored in a program ROM 63. A coin/credit detector 61 enables the CPU 60 to initiate a next game. A pay table ROM 64 detects the outcome of the game and identifies awards to be paid to the player. A payout device 62 pays out an award to the player in the form of coins upon termination of the game or upon the player cashing out. A payout may also be in the form of a coded paper ticket, credits on a smart card or magnetic strip card, or in any other form. A display controller 65 receives commands from the CPU 60 and generates signals for the various displays 66. If a display 66 is a touch screen, player commands may be input through the display screen into the CPU 60.

Figure 3:
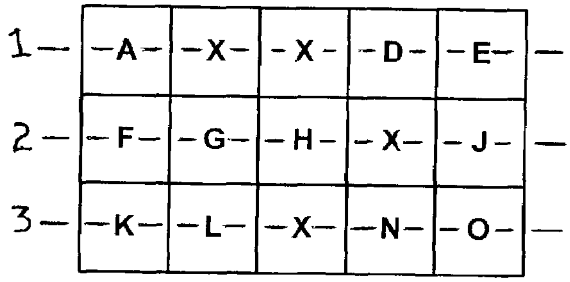
FIG. 3 illustrates the display on the display screen in FIG. 1 of a 5×3 array of randomly selected symbols and three pay lines to be used as an example to illustrate the present invention.

After the player makes a bet and presses a spin button, symbols are randomly selected by a pseudo-random number generator in the gaming machine (e.g., the CPU 60 carrying out a random number generating program) and displayed on the display screen. FIG. 3 is one example of a screen display on machine 10 after an initial game, showing three different pay lines 1, 2, and 3 and an array of symbols.

The gaming machine typically shows, either on its display glass or on a video screen, a pay table identifying the various awards that will be paid upon obtaining certain symbol combinations along activated pay lines. The player may be required to bet additional credits to activate additional pay lines.

After the initial display of the symbol array of FIG. 3, the player is awarded credits or paid coins based on any winning symbol combinations across activated pay lines, in accordance with the pay table. In another embodiment, the award to the player is postponed until after the secondary game, described below.

The secondary game may be activated by the player betting a maximum bet, or activated by the player wagering additional amounts, or activated by the player getting a certain winning symbol combination or trigger symbol in the initial game, or activated after each game. Other activating events may also be used. For example, the secondary game may be activated after a non-winning game to provide the player another possibility for a win.

Assuming the secondary game is activated, the player is now allowed to play the secondary game. The secondary game involves the player designating a species of symbol in the initial array of symbols and the gaming machine then randomly selecting one of the symbols in the array. If the symbol selected by the machine is one of the symbols designated by the player in the secondary game, the player wins a special award.

Figure 4:
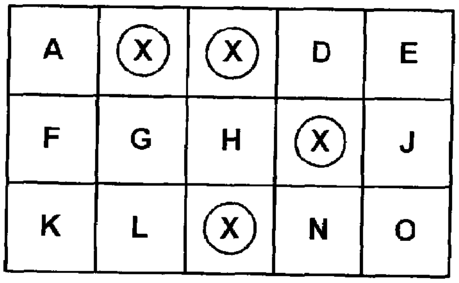
FIG. 4 illustrates that the player has designated the X symbol in the array of FIG. 3 for the secondary game.

In FIG. 4, the player has designated the species of the symbol X, since there are four X's in the array and the player wanted to choose a symbol that had the highest likelihood of being randomly selected by the gaming machine. The player's designation of the species of symbol X is identified by circles around the X symbols. The player may use a touch screen to designate her choice of any of the symbols in the array. When a player touches a single X symbol, all of the X symbols are designated. The player may have chosen any of the symbols in the array.

Figure 5:
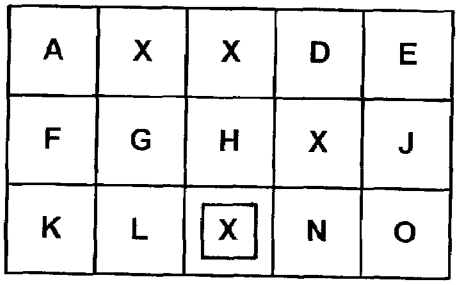
FIG. 5 illustrates that the gaming machine has randomly selected a symbol position in the array corresponding to one of the X symbols designated by the player, resulting in a special award to the player.

The gaming machine then determines, using a pseudo-random number generator, one of the symbols in the array. For added excitement, each of the symbols in the array may be successively illuminated or illuminated at random to convey to the player that a random selection process is occurring. After a period of time, the illumination sequencing ceases, and the selected symbol(s) is illuminated. FIG. 5 illustrates that the gaming machine has selected an X symbol, corresponding to the symbol species designated by the player, thus granting a special award to the player.

In one embodiment, the machine or the player can select more than one species of symbol in the array. For example, the player may make an additional wager to select more than one species of symbol. In another embodiment, the player may only select a particular symbol and not a species of symbol.

The amount of the award may be based upon the likelihood of the player's designated symbol species being selected. For example, the award paid for the gaming machine selecting the X symbol may be one-quarter the award for the machine selecting a symbol occurring only once in the array.

In one embodiment, the symbols include a multiplier symbol. If the multiplier symbol is selected, the award from the initial game is multiplied by the secondary game.

In one embodiment, the player may bet all or a portion of her win from the initial game, via buttons or a touch screen, then play the secondary game. Upon a win in the secondary game, the amount bet is then multiplied by a factor relating to the probability of the win occurring. In one embodiment, the player may play the secondary game several times, as long as the player still has credits to bet from the initial game. The player may quit the secondary game at any time.

The invention may be implemented in a stand-alone gaming machine, a gaming machine connected to a central server, a personal computer, a computer conducting online gaming, or in any other device.

Having described the invention in detail, those skilled in the art will appreciate that, given the present disclosure, modifications may be made to the invention without departing from the spirit of the inventive concepts described herein. Therefore, it is not intended that the scope of the invention be limited to the specific embodiments illustrated and described.

What is claimed is:

1. A gaming method performed by a gaming device wherein an award is granted to a player for winning combinations of symbols on a display screen, the method comprising:

conducting an initial game, conducting the initial game comprising displaying a randomly selected matrix of symbols on a screen, wherein a processor randomly selects the matrix of symbols;

granting an award to the player for any winning combinations of symbols displayed in the initial game, without any player involvement in selecting any symbols displayed in the initial game;

conducting a secondary game after the initial game has been completed and after the winning combinations of symbols have been determined, while the matrix of symbols selected in the initial game remains displayed on the screen, conducting the secondary game comprising:

allowing the player to directly select one or more symbols in the displayed matrix of symbols from the initial game as the matrix of symbols continues to be displayed, allowing the player to directly select one or more symbols comprising allowing the player to identify one or more specific symbols in the matrix, where all the symbols in the matrix remain in their positions in the matrix throughout the secondary game;

after the step of allowing the player to select one or more symbols, randomly selecting, by the gaming device, from only the symbols in the matrix, at least one of the symbols in the displayed matrix of symbols from the initial game as the matrix of symbols from the initial game continues to be displayed, the matrix of symbols having not changed from the matrix of symbols in the initial game; and granting an award to the player if the gaming device selected the one or more symbols previously selected by the player in the secondary game.

2. The method of claim 1 wherein granting an award to the player for any winning combinations of symbols displayed in the initial game occurs after the initial game and before the secondary game.

3. The method of claim 1 wherein the display screen comprises a touch screen, and wherein allowing the player to select one or more symbols in the matrix of symbols comprises receiving signals pursuant to the player touching an area of the touch screen corresponding to the one or more symbols that the player wishes to select.

4. The method of claim 1 further comprising determining by the gaming device whether a maximum bet has been bet by the player in order to initiate the secondary game.

5. The method of claim 1 further comprising determining by the gaming device whether the player has made one or more additional wagers to initiate the second game.

6. The method of claim 1 further comprising determining by the gaming machine whether a particular winning combination of symbols has been displayed in the initial game in order to initiate the secondary game.

7. The method of claim 1 further comprising determining by the gaming device whether a trigger symbol has been displayed in the initial game in order to initiate the secondary game.

8. The method of claim 1 further comprising determining by the gaming device that the initial game was a non-winning game in order to initiate the secondary game.

9. The method of claim 1 wherein allowing the player to select one or more symbols in the matrix of symbols comprises receiving signals corresponding to the player selecting a species of symbols displayed in the matrix.

10. The method of claim 1 wherein allowing the player to select one or more symbols in the matrix of symbols comprises receiving signals corresponding to the player selecting only one symbol in the matrix.

11. The method of claim 1 wherein allowing the player to select one or more symbols in the matrix of symbols comprises receiving signals corresponding to the player selecting a plurality of symbols in the matrix.

12. The method of claim 1 wherein selecting, by the gaming device, at least one of the symbols in the matrix of symbols comprises the gaming device selecting the at least one of the symbols in the matrix of symbols using a pseudo-random number generator.

13. The method of claim 1 further comprising:

receiving a signal from the player indicating a bet made for playing the secondary game, the bet being at least a portion of the award from the initial game;

wherein granting an award to the player if the gaming device selected the one or more symbols selected by the player in the secondary game comprises granting an award based on the bet.

14. The method of claim 13 wherein the award granted in the secondary game is a multiple of the bet.

15. The method of claim 13 wherein the award in the secondary game is based on the bet multiplied by a factor relating to a probability of the player winning the secondary game.

16. The method of claim 13 further comprising conducting the secondary game multiple times upon additional bets being made by the player.

17. A gaming device comprising:

a display for displaying a game including an initial game, the initial game displaying a randomly selected matrix of symbols on a screen, certain combinations of symbols across at least one pay line determining an award to a player; and at least one processor adapted and programmed for carrying out the following method:

conducting an initial game, the initial game randomly selecting an matrix of symbols and displaying the matrix of symbols on the display;

granting an award to the player for any winning combinations of symbols displayed in the initial game, without any player involvement in selecting any symbols displayed in the initial game;

conducting a secondary game after the initial game has been completed and after the winning combinations of symbols have been determined, while the matrix of symbols selected in the initial game remains displayed on the screen, conducting the secondary game comprising:

allowing the player to directly select one or more symbols in the displayed matrix of symbols from the initial game as the matrix of symbols continues to be displayed, allowing the player to directly select one or more symbols comprising allowing the player to identify one or more specific symbols in the matrix, where all the symbols in the matrix remain in their positions in the matrix throughout the secondary game;

after the step of allowing the player to select one or more symbols, randomly selecting, by the gaming device, from only the symbols in the matrix, at least one of the symbols in the displayed matrix of symbols from the initial game as the matrix of symbols from the initial game continues to be displayed, the matrix of symbols having not changed from the matrix of symbols in the initial game; and granting an award to the player if the gaming device selected the one or more symbols previously selected by the player in the secondary game.

18. The device of claim 17 wherein the display comprises a touch screen, and wherein allowing the player to select one or more symbols in the matrix of symbols comprises receiving signals pursuant to the player touching an area of the touch screen corresponding to the one or more symbols that the player wishes to select.

19. The device of claim 17 wherein allowing the player to select one or more symbols in the matrix of symbols comprises receiving signals corresponding to the player selecting a species of symbols displayed in the matrix.

20. The device of claim 17 wherein allowing the player to select one or more symbols in the matrix of symbols comprises receiving signals corresponding to the player selecting only one symbol in the matrix.

21. The device of claim 17 wherein allowing the player to select one or more symbols in the matrix of symbols comprises receiving signals corresponding to the player selecting a plurality of symbols in the matrix.

22. The device of claim 17 wherein the at least one processor includes a pseudo-random number generator, and wherein selecting, by the gaming device, at least one of the symbols in the matrix of symbols comprises the gaming device selecting the at least one of the symbols in the matrix of symbols using the pseudo-random number generator.

* * * * *